(No Model.)
R. THAYER.
SIPHON.
No. 523,418. Patented July 24, 1894.
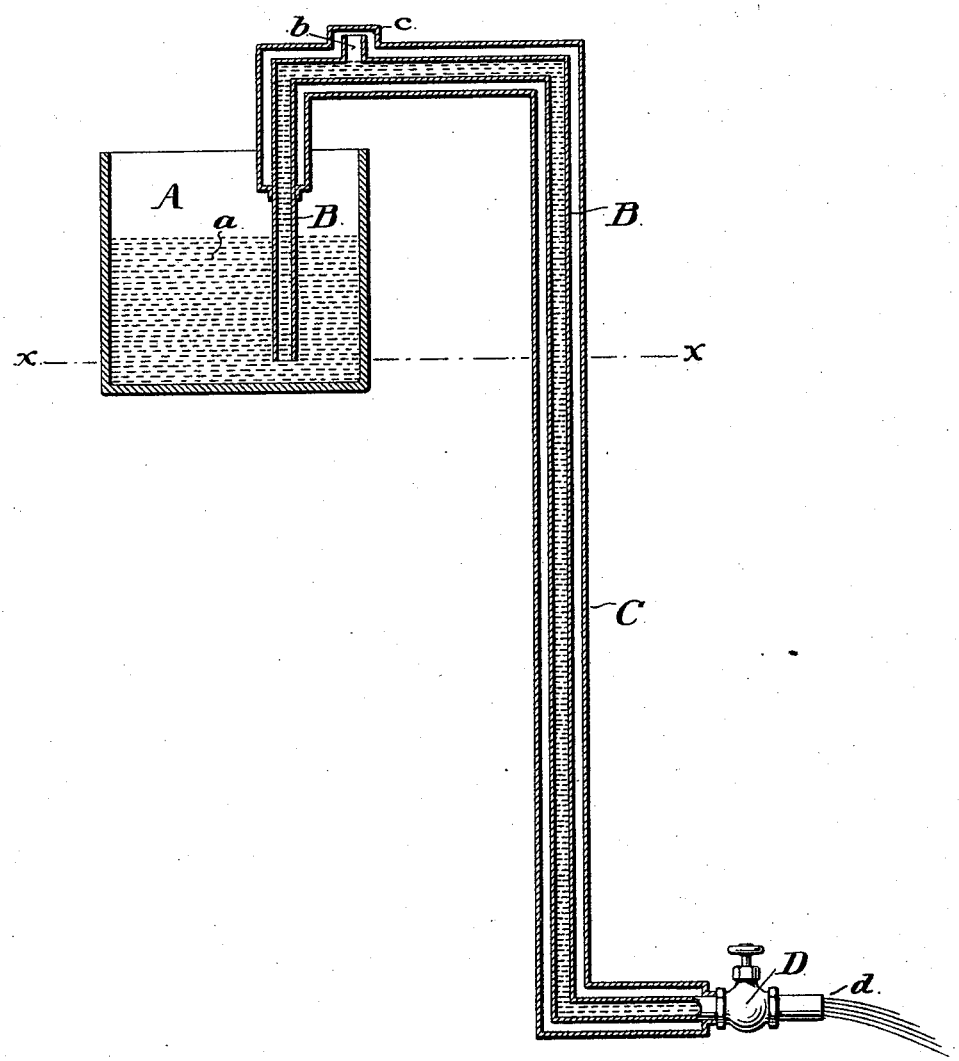
WITNESSES:
J. E. Paige
James H. Bell
INVENTOR
Russell Thayer
By Hollingsworth & Haley
Attorneys

UNITED STATES PATENT OFFICE.

RUSSELL THAYER, OF PHILADELPHIA, PENNSYLVANIA.

SIPHON.

SPECIFICATION forming part of Letters Patent No. 523,418, dated July 24, 1894.

Application filed February 23, 1894. Serial No. 501,253. (No model.)

*To all whom it may concern:*

Be it known that I, RUSSELL THAYER, of Philadelphia, in the State of Pennsylvania, have invented certain new and useful Improvements in Siphons, whereof the following is a specification, reference being had to the accompanying drawing, which represents a vertical central section through the apparatus.

The object of my invention is to prevent the occurrence of accidental leakage from siphons, owing to breaks or perforations in the pipe.

It is well known that where a substantial perforation, capable of admitting air to the interior of a siphon pipe, occurs above the level of equilibrium of the two columns in the respective arms of the siphon the liquid will no longer continue to flow. Where, however, such leak occurs at a point in the long arm of the siphon below the line of equilibrium of the two columns, the siphoning action may continue without interruption.

Where siphons are employed for the conduct of inflammable or destructive fluids as, for instance, gasoline, petroleum, acids and the like, the consequences of such leaks may be very serious; especially where, as in some instances, the flow of liquid is intended to be stopped by a faucet at the lower end of the longer arm over night, or during any period when the apparatus is not under inspection.

By my invention a means is provided whereby a leak occurring at what otherwise would be a dangerous point automatically acts to cause the discontinuance of flow through the apparatus, the subsequent discharge being limited to the fluid which is actually contained at the moment within a portion of the siphon pipe.

In principle the apparatus may be said to consist practically in transferring the location of a leak of the siphon pipe to such a point as will, by the introduction of atmospheric air, break the column. Theoretically the point to which the leak is to be thus transferred may be anywhere above the line of equilibrium of the two columns; but, for practical reasons, I prefer to locate it as in the apparatus of the accompanying drawing, which will now be described in detail.

In said drawing, A represents the receptacle for liquid, $a$, which is to be discharged to a lower level.

B represents the siphon pipe proper having a short arm located near the bottom of the tank, A, and a long arm which is provided with a stop-cock, D, controlling the outlet of liquid at the nozzle, $d$. The siphon proper, B, is provided, preferably at a point in its highest level, with an opening, $b$.

A continuous, closed casing, C, surrounds the siphon pipe, B, so as to leave an air space which communicates with the opening at $b$. In the instance shown the casing is provided with an offset, $c$, to accommodate the raised flange with which I prefer to provide the said opening, $b$. The line $x\ x$ indicates the level at which the two columns of liquid are in equilibrium.

The operation of the device is as follows: So long as the casing, C, is intact, the siphoning action once induced in the pipe, B, will continue, the air normally contained in the space between the casing, C, and the pipe, B, being inert so far as any tendency to enter the opening at $b$ is concerned; but the moment that any breakage or perforation occurs in the casing, C, the air will flow in and enter the siphon pipe proper, B, at the opening, $b$. The effect will of course be to break the column of liquid, and so soon as the liquid has been discharged from the long arm of the siphon and that portion of the intermediate pipe which is between the long arm and the opening, $b$, the flow will absolutely stop. Incidentally, of course, the casing, C, serves to protect the siphon pipe proper, B, from accidental injury; but such protection is not the primary object of my invention, and, as I am aware that the use of jackets or casing for pipes is not new, I do not claim the same.

In the accompanying drawing I have shown the casing, C, as surrounding the siphon pipe practically throughout its entire length; but I do not limit my claim to this particular embodiment, since it is of course only necessary, for purposes of safety, to surround those portions of the pipe at which a leak would be attended with dangerous results, and to effect in any way a communication between such limited casing and the part of the siphon pipe where the admission of air would operate to break the column. Hence in my claim, when I refer to the casing as inclosing the siphon pipe, I wish to be understood as not necessarily implying that the entire pipe is thus inclosed, it being within the purpose of my invention to limit the extent of the casing to such part of the pipe as needs the safe-guard thus afforded.

Having thus described my invention, I claim—

The combination with a siphon pipe, having an opening above the level of equilibrium in its two arms, of a closed casing surrounding the said pipe and communicating with said opening, substantially as set forth.

RUSSELL THAYER.

Witnesses:
JAMES H. BELL,
H. MASON CLAPP.